Patented Mar. 10, 1925.

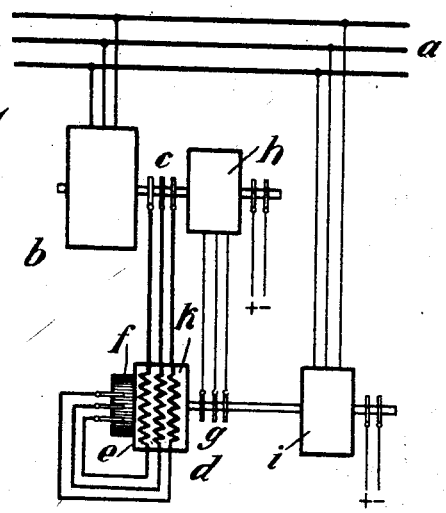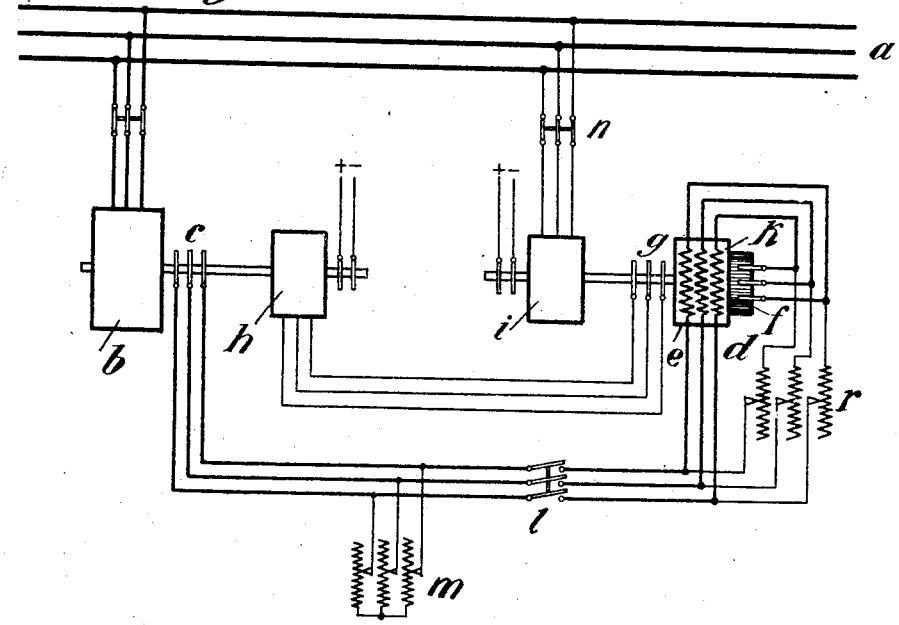

1,528,773

UNITED STATES PATENT OFFICE.

JAROSLAV KOZISEK, OF CHARLOTTENBURG, BERLIN, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

ARRANGEMENT FOR THE CONTROLLING OF ASYNCHRONOUS MACHINES.

Application filed August 23, 1921. Serial No. 494,561.

*To all whom it may concern:*

Be it known that I, JAROSLAV KOZISEK, a citizen of the Austrian Republic, and residing at Pestalozzistr. 52, Charlottenburg, Berlin, Germany, have invented certain new and useful Arrangements for the Controlling of Asynchronous Machines, for which I have filed applications in Germany, March 23rd, 1920, April 4th, 1920, June 12, 1920, July 23rd, 1920 and August 24th, 1920; Holland, March 31st, 1921; Spain, March 30th and 31st, 1921, Patents Nos. 77,815 and 11,450, respectively; Italy, March 23rd, 1921; Switzerland, March 22nd, 1921; Belgium, March 26th and 30th, 1921, Patent No. 295,124; France, March 28th, 1921, Patent No. 532,859; Germany, May 12th, 1921; Hungary, April 8th and 16th, 1921; England, April 8th, 1921, and April 11th, 1921, Patent No. 186,088, and of which the following is a specification.

This invention relates to an arrangement of machines for the control of asynchronous machines in which the rotor of the asynchronous machine to be controlled is electrically connected with an alternating current commutator machine. The slip currents of the asynchronous machine are supplied to the commutating machine through the commutator and a stator winding.

The invention permits of obtaining a good regulation also for the case when the asynchronous machine passes through synchronism. For this purpose the excitation of the alternating current commutator machine is derived from a synchronous machine.

The accompanying drawings illustrate by way of example one mode of carrying the invention into effect together with various modifications thereof.

Figure 1 illustrates a control arrangement comprising an asynchronous machine $b$ that is supplied with current from a three-phase net-work $a$, an alternating current commutator machine $d$ connected therewith and a synchronous excitation machine $h$ for the alternating current commutator machine, and Figure 2 illustrates a controlling arrangement according to Figure 1, in which the ampere-turns of the stator of the alternating current commutator machine are variable.

The invention is broadly illustrated in the control arrangement shown in Figure 1. The alternating current commutator machine $d$ with the stator $e$ and the commutator $f$ is electrically connected with the slip rings $c$ of the asynchronous machine $b$. The required excitation is supplied to the slip rings $g$ from the synchronous excitation machine $h$ which is mounted on the shaft of the asynchronous machine $b$. The alternating current commutator machine $d$ is driven by the synchronous machine $i$ which is supplied with current from the net-work $a$.

The stator $e$ is provided with a compensating winding $k$ arranged in series with the slip rings $c$ of the asynchronous machine $b$ and the commutator $f$ of the machine $d$, the compensating winding being adapted to compensate the field produced by the slip current through the windings of the rotor of the machine $d$.

It is well known in arrangements for regulating asynchronous machines by means of commutator machines, to use synchronous machines for exciting the commutator machine. In such arrangements, however, the commutator machine acts as a frequency converter which does not convert electrical energy into mechanical energy, the latter conversion taking place in the synchronous machine which furnishes the magnetizing current for the commutator machine. Consequently a synchronous machine of considerably larger size must be used than the synchronous exciter machine according to the present invention. Besides in the arrangements heretofore known, the high harmonics which are transferred from the rotor of the asynchronous machine into the rotor of the commutator machine are not removed, since in the commutator machine no compensating winding is provided which neutralizes the field which is produced by the slip current in the commutator machine.

During the control period of the asynchronous machine the commutator machine receives or supplies mechanical energy. In the state below synchronism the electrical energy that is derived from the rotor of the asynchronous machine is transformed into mechanical energy in the commutator machine and is returned to the net-work through the synchronous machine $i$. The control is effected by pure voltage regulation in the excitation circuit of the commutator machine in one of the well-known manners in connection with alternating current synchronous machine either by variation of the continuous current excitation or by means of rotary converters or double rotary converters, or when a step connection in a certain sense is desired by the insertion of transformers between the excitation machine and the slip ring circuit of the alternating current commutation machine.

If the voltage of the asynchronous machine $h$ is reduced, the field of the commutator machine is decreased and correspondingly also the voltage on its brushes and consequently the slip voltage of the main motor. Synchronism is obtained when the voltage of the excitation synchronous machine $h$ is nil. By reversing the excitation or by using an equivalent connection by which the rotary field is electrically turned through 180°, the voltage on the brushes of the commutator machine gradually increases and consequently the speed of rotation of the asynchronous machine increases beyond synchronism. Thus the transformation of energy is reversed. The synchronous machine $i$ receives electric energy from the net-work and supplies mechanical energy to the commutator machine which mechanical energy is converted into electrical energy in the latter and is supplied as such to the slip rings of the main machine.

The control arrangement according to the invention is also useful in the case of machines in which the hitherto known controlling sets could not at all be used, namely in asynchronous machines in which strong harmonics occur in the secondary circuits, thus for instance in single-phase induction machines as well as alternating current machines with any number of phases and having means for varying the number of poles.

If, as is customary, the excitation of the commutator machine is derived from the secondary circuits of the asynchronous machine the harmonics are led by the excitation through the commutator and produce difficulties of commutation in the latter.

In the control arrangements according to the invention these harmonics disappear as the excitation of the commutator machine is supplied by the synchronous machine which is independent of the secondary circuits of the asynchronous machine, which synchronous machine does not produce any harmonics. The harmonics which may tend to enter from the rotor of the asynchronous machine into the commutator machine through the stator and the commutator of the latter, are prevented from doing so by the compensating winding of the stator of this machine, since this winding compensates the whole field produced in the rotor by the slip currents passing it.

The arrangement according to the invention may be improved by making the stator ampere-turns of the commutator machine which is provided with a stator compensating winding, adjustable; this may be effected in a simple way by bridging over the stator winding by a resistance which can be adjusted preferably down to a short circuit. In this way it is possible to use the commutator machine as a starting motor for the self starting as well as for the starting of the parts of the control arrangement coupled therewith. Further, the driving load of the commutator machine may be adjusted at will during working.

This improvement is illustrated in Figure 2 which is a modification of the control arrangement illustrated in Figure 1. In this case the stator winding $e$ of the commutator machine is bridged over by the resistance $r$. In this arrangement it is possible for instance after the main machine $b$ has been brought to its speed by means of the starting resistance $m$, to start the commutator machine $d$ with open switches $l$ and $n$ by means of the regulating resistance $r$ as an induction motor supplied with current through the rotor from the machine $h$. After the normal speed has been reached the connections for operation are established.

What I claim is:—

1. The combination of an asynchronous machine with an alternating current commutator machine connected in cascade to the secondary of said asynchronous machine, a compensating winding on the stator of said commutator machine in series with the commutator and with the secondary of said asynchronous machine, and a synchronous machine electrically connected to the rotor of said commutator machine and adapted to excite the latter.

2. The combination of an asynchronous machine with an alternating current commutator machine connected in cascade to the secondary of said asynchronous machine, a compensating winding on the stator of said commutator machine in series with the commutator and with the secondary of said asynchronous machine, and a synchronous machine electrically connected to the rotor of said commutator machine and adapted to excite this machine, said synchronous machine being mechanically connected to the asynchronous machine.

3. The combination of an asynchronous machine with an alternating current commutator machine connected in cascade to the secondary of said asynchronous machine, a compensating winding on the stator of said commutator machine in series with the commutator and with the secondary of said asynchronous machine, a synchronous machine electrically connected to the rotor of said commutator machine and adapted to excite this machine, and means for regulating the ampere turns of the stator of the commutator machine.

4. The combination of an asynchronous machine with an alternating current commutator machine connected in cascade to the secondary of said asynchronous machine, a compensating winding on the stator of said commutator machine in series with the commutator and with the secondary of said asynchronous machine, a synchronous machine electrically connected to the rotor of said commutator machine adapted to excite this machine, and an adjustable resistance in shunt with the stator winding of the commutator machine.

In testimony whereof I affix my signature.

JAROSLAV KOZISEK.